(12) United States Patent
LePori

(10) Patent No.: US 12,251,050 B2
(45) Date of Patent: Mar. 18, 2025

(54) BLENDING BLADE

(71) Applicant: Sunbeam Products, Inc., Boca Raton, FL (US)

(72) Inventor: Jeff LePori, Hattiesburg, MS (US)

(73) Assignee: Sunbeam Products, Inc., Atlanta, GA (US)

( * ) Notice: Subject to any disclaimer, the term of this patent is extended or adjusted under 35 U.S.C. 154(b) by 182 days.

(21) Appl. No.: 17/811,086

(22) Filed: Jul. 7, 2022

(65) Prior Publication Data
US 2023/0008111 A1   Jan. 12, 2023

Related U.S. Application Data

(60) Provisional application No. 63/219,001, filed on Jul. 7, 2021.

(51) Int. Cl.
*A47J 43/07* (2006.01)

(52) U.S. Cl.
CPC .................. *A47J 43/0722* (2013.01)

(58) Field of Classification Search
CPC ...... A47J 43/0722; A47J 43/046; A47J 43/07; A47J 43/0716; A47J 43/0727
See application file for complete search history.

(56) References Cited

U.S. PATENT DOCUMENTS

| | | | | |
|---|---|---|---|---|
| 7,641,380 B2 * | 1/2010 | Behar | .................. | A47J 43/0722 366/205 |
| 8,132,752 B1 * | 3/2012 | Hotaling | ............. | A47J 43/0722 241/292.1 |
| D682,030 S * | 5/2013 | Ezechukwu | .................. | D7/412 |
| D684,817 S * | 6/2013 | Leavitt | ............ | D7/412 |
| 8,690,093 B2 * | 4/2014 | Rukavina | .............. | B01F 27/112 366/205 |
| D770,228 S * | 11/2016 | Pan | ................................ | D7/378 |
| 9,533,269 B2 * | 1/2017 | Guo | .................... | A47J 43/0711 |
| 9,560,936 B2 * | 2/2017 | Wade | .................. | A47J 43/0722 |
| 9,968,223 B2 * | 5/2018 | Behar | ................. | A47J 43/0722 |
| 2015/0272395 A1 * | 10/2015 | Dahlbäck | ................ | B01F 27/61 366/343 |
| 2016/0316971 A1 * | 11/2016 | Behar | ................. | A47J 43/0722 |
| 2017/0208999 A1 * | 7/2017 | Lee | ......................... | B02C 18/18 |
| 2019/0000273 A1 * | 1/2019 | Sapire | .................... | A47J 43/085 |
| 2021/0127893 A1 * | 5/2021 | Sapire | ................... | A47J 43/085 |

FOREIGN PATENT DOCUMENTS

| | | | | |
|---|---|---|---|---|
| CN | 203802325 U | * | 9/2014 | .......... A47J 43/0722 |
| CN | 206137981 U | * | 5/2017 | .............. A47J 43/07 |
| CN | 107296528 A | * | 10/2017 | .......... A47J 43/0722 |
| CN | 206548376 U | * | 10/2017 | .......... A47J 43/0722 |

(Continued)

*Primary Examiner* — Faye Francis
(74) *Attorney, Agent, or Firm* — Husch Blackwell LLP

(57) ABSTRACT

An improved blade assembly is provided for use in a cooking appliance such as a blender or a food processor. The bottom blade portions of the blade assembly include a geometry that provides an angled, sharpened portion on wing portions that extend downwardly from the bottom blade. The bottom blade's geometry, including the sharpened portions, help rotate the material so that it is blended upwardly to help prevent food from getting stuck in the void below the bottom blade, thus improving the blade's efficiency.

18 Claims, 6 Drawing Sheets

(56) References Cited

FOREIGN PATENT DOCUMENTS

| CN | 207492675 U | * | 6/2018 | ............ A47J 43/046 |
| CN | 208371655 U | * | 1/2019 | .......... A47J 43/0722 |
| CN | 208371657 U | * | 1/2019 | .......... A47J 43/0722 |
| CN | 109700337 A | * | 5/2019 | .......... A47J 43/0722 |
| CN | 209091040 U | * | 7/2019 | .......... A47J 43/0722 |
| CN | 110301842 A | * | 10/2019 | ............ A47J 43/046 |
| DE | 202015009744 U1 | * | 12/2019 | .......... A47J 43/0722 |
| WO | WO-2018223555 A1 | * | 12/2018 | .............. A47J 31/44 |

* cited by examiner

BLENDING BLADE

CROSS-REFERENCE TO RELATED APPLICATIONS

This patent application claims priority to U.S. Provisional Patent Application Ser. No. 63/219,001, filed Jul. 7, 2021, the entirety of which is incorporated herein by reference.

FIELD OF THE INVENTION

The present invention relates to a food processor or blender blade set. More particularly, the invention relates to an improved blade in a food processor blade set that improves the ability of the food processor blender to chop, cut, or slice foodstuffs.

BACKGROUND OF THE INVENTION

Food processor and blender manufacturers have tried using multiple blades to improve an appliance's performance for many years. Such improvements in performance may relate to improving speed or efficiency of blending and/or food processing. One such area of particular improvement focuses on the ability of the blade set to prevent food from getting stuck in the void formed between the bottom blade and the jar. Manufacturers are constantly adjusting the number of blades, as well as the size, shape, and configurations of the blades. Manufacturers even have changed the jar and jar rib configurations to improve performance. Despite the constant adjustments, manufacturers have struggled to find a blade configuration, shape, size, etc. that helps prevent food from getting stuck in the void formed below a blade set.

SUMMARY OF THE INVENTION

The present disclosure relates generally to a blade assembly comprising a plurality of blade forms, each designed to perform a specific blending or processing task. The blades of the blade assembly further work together and with the geometric restrictions of the jar to improve the assembly's capability to crush ice and blend or mix liquids and/or semi-solid materials. The blades of the blade assembly may chop, cut, or slice solid food items without the need for user interaction to clear compacted items from the blades and/or the walls or bottom of the jar during its operation or between blending or processing actions.

The new blade assembly described herein allows more material to be moved by reducing the void between the bottom of the jar and the bottom blade. More particularly, the bottom blade of the present blade configuration includes a leading edge having an angled sharpened portion that moves the material to be blended upwardly to help prevent food from getting stuck in the void below the bottom blade. The sharpened portion, which may be at a range of angles but is preferably, in some embodiments, at or near 45°, may cause the solids in the bottom of the container to be elevated by the rotation of the blade in an auger-type helical path. The rotation may increase the cutting efficiency of the blades.

The improved performance of the blade assembly improves appliance efficiency and thus also serves the beneficial side effect of improved bearing and motor life in the blender/food processor.

BRIEF DESCRIPTION OF THE DRAWINGS

For a better understanding of the various embodiments of the present invention, reference may be made to the accompanying drawings in which.

Figure 1:
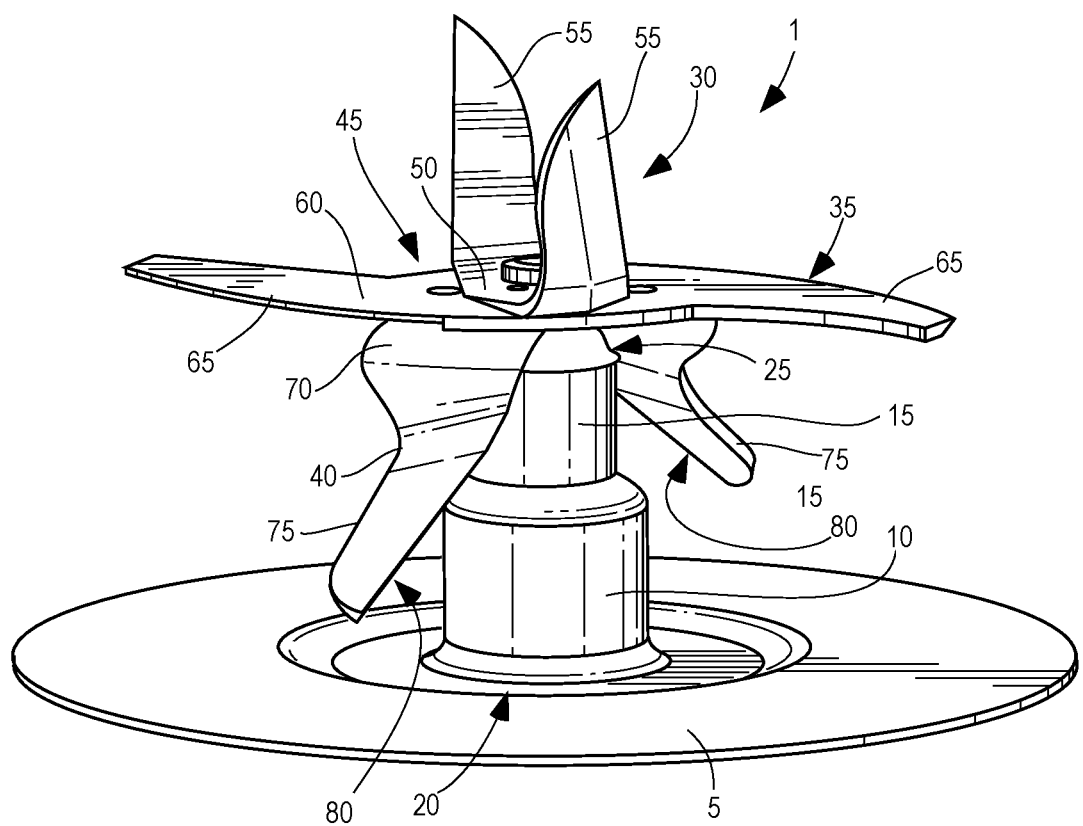
FIG. 1 is a perspective view of a blade assembly constructed according to the teachings of the present disclosure.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE DRAWINGS

The disclosure will now be described with reference to the drawing figures, in which like reference numerals refer to like parts throughout. For purposes of clarity in illustrating the characteristics of the present disclosure, proportional relationships of the elements have not necessarily been maintained in the drawing figures.

Turning first to FIG. 1, a blade assembly 1 is provided for use in a large throat blender jar (not illustrated). The blade assembly 1 preferably has improved blending and mixing capabilities. In some embodiments, the assembly also provides enhanced food processing capabilities. Such enhancements may, for example be measured by increased ability to macerate food items over conventional blade assemblies that do not include the improved blade and its associated geometry described herein.

The blade assembly 1 may comprise a base member 5 having a central post 10 extending upwardly therefrom. In some embodiments, the central post 10 may be hollow. A rotatable shaft 15 may be mounted on or within the post 10. The shaft 15 is preferably connected or configured to be connected to the appliance's motor (not illustrated) at a lower end 20. A plurality of blades (described below) is connected or configured to be connected at an upper end 25. The motor may drive the rotating shaft 15 which in turn moves the blade assembly 1, causing the blending/processing of the liquid and/or food items within the blender jar.

The blade assembly 1 is designed to provide improved blending and mixing capabilities, and in some embodiments enhanced food processing operations. The assembly 1 may comprise a plurality of blades in a stacked formation that operate in concert with each other to individually and cooperatively achieve the desired handling of the items within the jar. In one embodiment of the present disclosure illustrated in FIG. 1, the blade assembly 1 may include a first or top blade 30, a second or middle blade 35, and a third or bottom blade 40 joined to form a blade stack 45. The blades 30, 35, 40 when unbent may be the same or similar size, or they may differ in size, depending on the application.

The first or top blade 30 may be a generally U-shaped blade primarily useful for crushing ice. The top blade 30 may comprise a central, generally flat base portion 50 extending radially outward with respect to the axis of rotation of the blade assembly 1. First and second wing portions 55 may extend at an angle upward from opposing ends of the central base portion 50 of the top blade 30. It should be noted that the angle of each wing portion 55 may be individually set to improve or optimize the performance of the blade 30, both individually and in conjunction with the remainder of the blade assembly 1 and the internal jar geometry.

The second or middle blade 35 of the blade stack 45 may comprise a central, generally flat base portion 60 extending radially outward with respect to the axis of rotation of the blade assembly 1. Typically, the middle blade 35 does not include a vertically angled portion. The middle blade 35, however, may be generally S-shaped. Such a shape provides for a longer blade length, which may have a continuous-radius edge 65. The continuous-radius edge 65 preferably allows the middle blade 35 to operate effectively at chopping, cutting, and slicing solid food items, including vegetables, nuts, and meats.

The third or bottom blade 40 may be U-shaped. The U-shape may be similar to the first or top blade 30, or may differ in shape, size or angle. The bottom blade 40 preferably includes a generally flat base portion 70 extending radially outwardly, relative to the axis of rotation of the blade assembly 1. First and second wing portions 75 may extend at one or more angles downwardly from opposing ends of the base portion 70 of the bottom blade 40. Each wing portion 75 preferably includes a sharpened, leading edge 80 that performs the chopping, blending, cutting, or similar action when the blade assembly 1 is in use.

Figure 2:
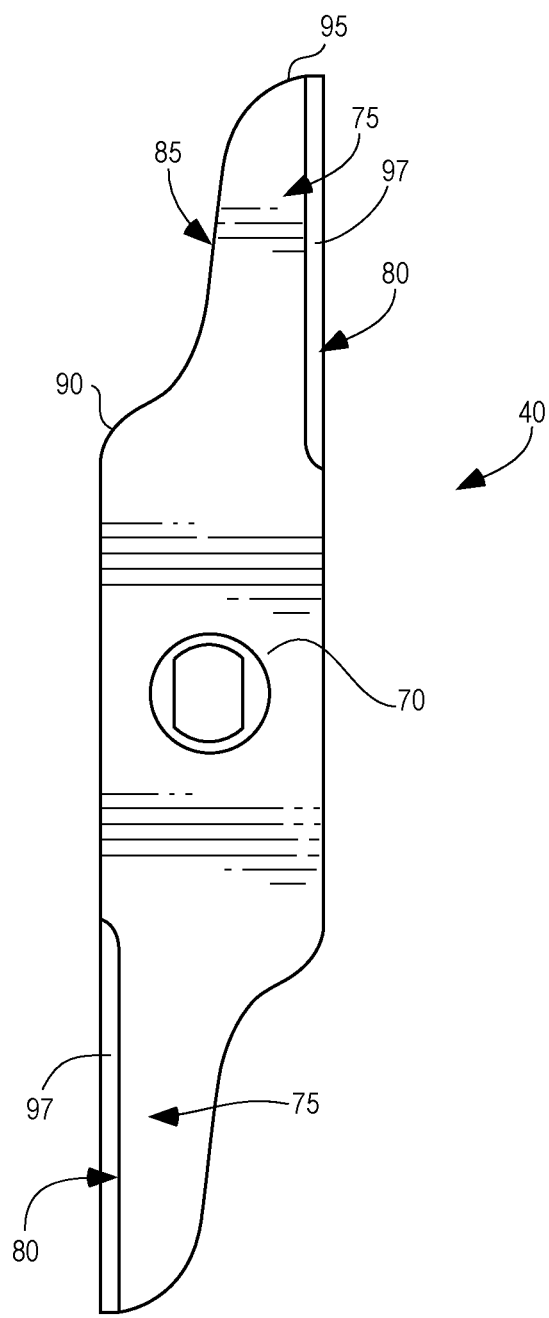
FIG. 2 is a top plan view of a bottom blade of the blade assembly of FIG. 1, the bottom blade in a flat state.

FIG. 2 illustrates the bottom blade 40 in its unbent form (where the wing portions 75 have yet to be bent downwardly and the blade 40 is substantially flat). As illustrated in FIG. 2, the leading edges 80 are substantially straight, while trailing edges 85 include a degree of curvature. More specifically, a first curvature 90 that projects toward the leading edge 80 may be nearer the center of the blade 40 than a second curvature 95 that projects away from the leading edge 80. Each of the curvatures 90, 95 may have a range of foreseeable radii but in a preferred embodiment may be approximately 0.265 inches, or they may be in the range of between about 0.240 and about 0.290 inches, for example. The curvatures 90, 95 preferably principally reduce the weight of the bottom blade 40, and as such their radii may vary widely.

The leading edge 80 preferably includes an angled sharpened portion 97. The sharpened portion 97 carries out the majority of the cutting process and is at approximately a 45° angle relative to a plane in which the substantially flat base portion 70 lies, such that the sharpened portion 97 slants upward and away from the trailing edge 85 by approximately 45°. In alternative embodiments, this angle may vary, preferably between 30° and 60°.

It should be noted that the angles of the curved wing portions 75 of the bottom blade 40 may be substantially similar so as to improve the ability of the blade 40 to "clear" the lower portion of the jar without the introduction of any blade cavitation or turbulent flow that would unnecessarily pull the jar's contents back beneath the blade stack 45 before its complete processing. The angled wing portions 75, when coupled with the angled sharpened portion 97, may create a "twist" motion in the lower blade 40 when in use to cause solids in the bottom of the container to be elevated by the rotation of the blade 40 in an auger type helical path. This helical motion may increase the cutting efficiency of the blade stack 45. Further, because the sharpened portions 97 are angled, the surface area of the blade 40 is less, which allows the leading edges 80 of the blade 40 to do more work. The food thus may stay in the path of the blade 40 longer, which improves food contact for cutting.

Figure 3:
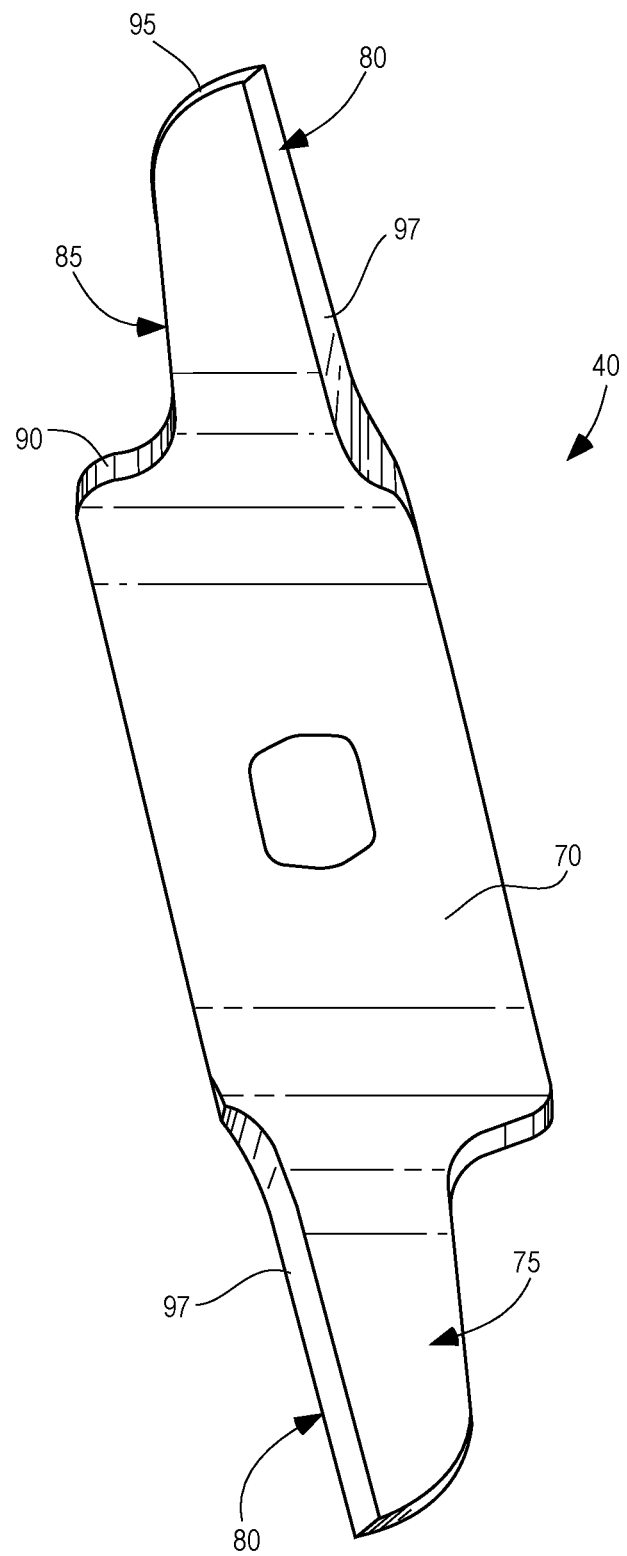
FIG. 3 is a bottom plan view of the bottom blade of FIG. 2 in a bent state.
Figure 4:
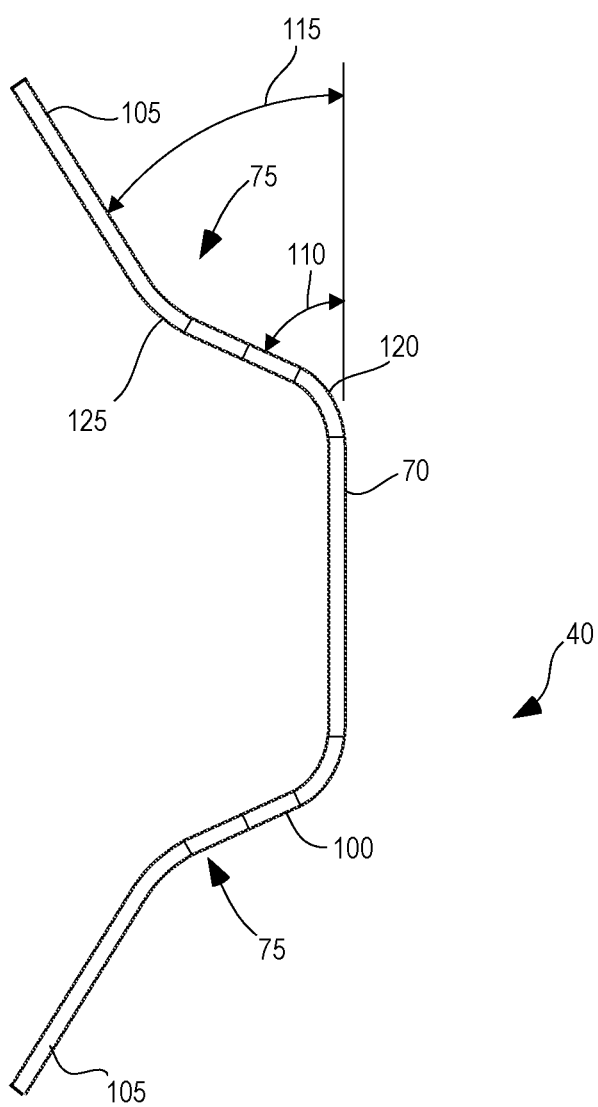
FIG. 4 is an elevation view of the bottom blade of FIG. 3 in the bent state.

FIGS. 3 and 4 illustrate the first and second curved wing portions 75 extending at an angle downward and outward from opposing ends of the central base 70 of the bottom blade 40. As provided in FIG. 4, when the bottom blade 40 is bent, the wing portions 75 generally include a first segment 100 and a second segment 105.

The first segment 100 is preferably bent at an angle 110 relative to the flat central base 70, while the second segment 105 is preferably bent at an angle 115 relative to the flat central base 70. The angles 110, 115 may vary within reasonable ranges (approximately by 15° in either direction) but in at least one embodiment may be about 64.1° (i.e., about 64°) and about 30°, respectively. A first curved portion 120 is preferably provided that transitions the base 70 to the first segment 100, and a second curved portion 125 is preferably provided that transitions the first segment 100 to the second segment 105. The first curved portion 120 and the second curved portion 125 may vary in radii, but in at least one embodiment may be 0.169 and 0.250 inches, respectively. The radii may vary by 0.1 inches or more since the principal purpose of the curved portions 120, 125 is to reduce the weight of the blade 40.

Figure 5:
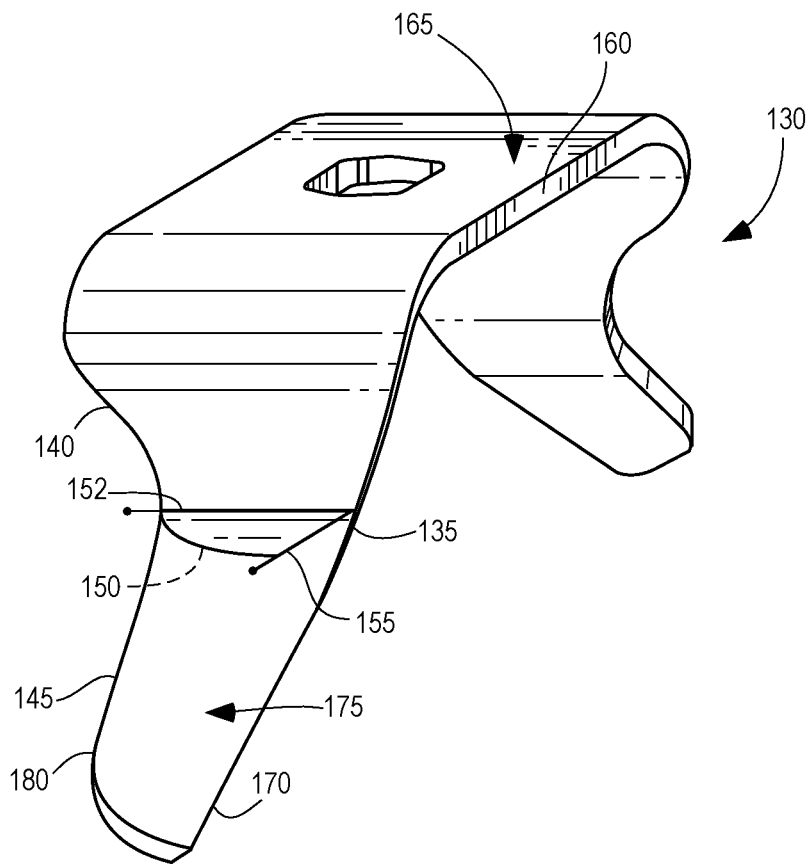
FIG. 5 is a perspective view of a first embodiment of the bottom blade of FIGS. 3 and 4 in the bent state.
Figure 6:
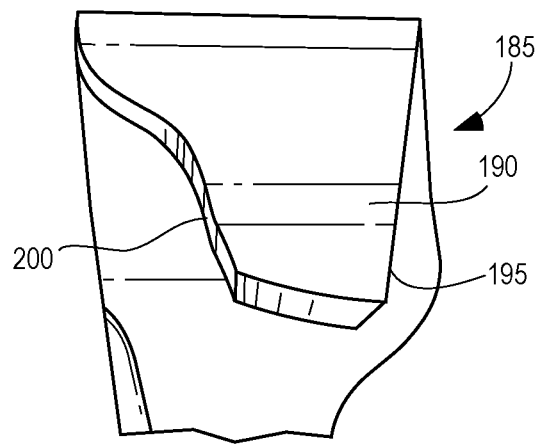
FIG. 6 is a perspective view of a second embodiment of the bottom blade of FIG. 5.
Figure 7:
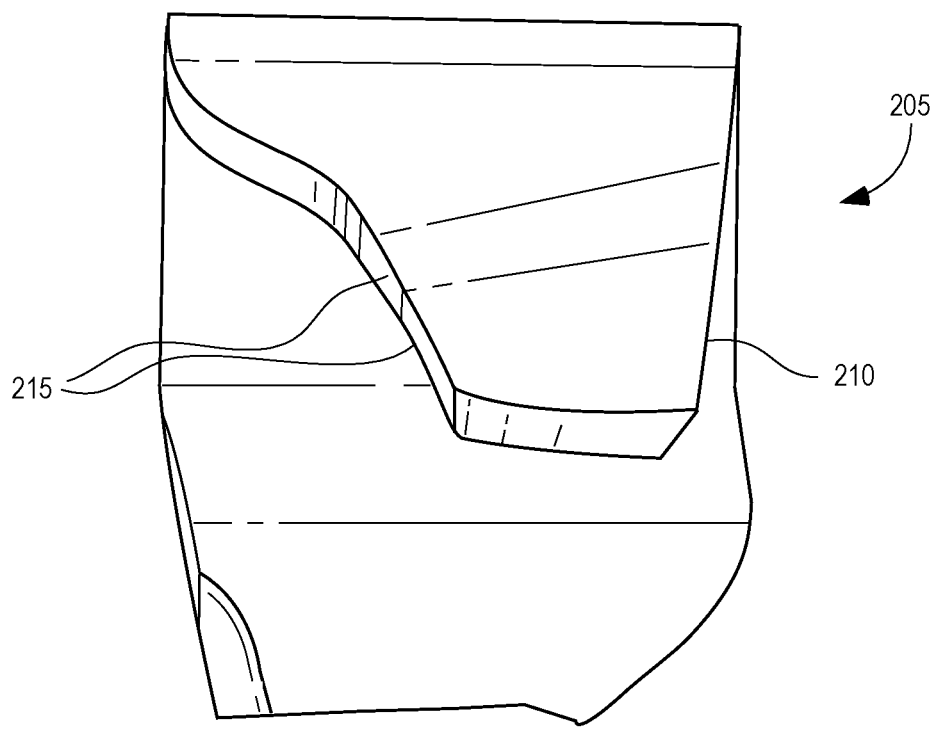
FIG. 7 is a perspective view of a third embodiment of the bottom blade of FIGS. 5 and 6.

FIGS. 5-7 illustrate three different embodiments of a bottom blade that is substantially similar to the bottom blade 40. Turning first to FIG. 5, a bottom blade 130 is illustrated where a bend is provided in the bottom blade 130 at a second curved portion 135 substantially similar to the second curved portion 125 in that it is between a first segment 140 of the bottom blade 130 and a second segment 145 of the bottom blade 130. The bend may contribute to additional geometry structures of the blade 130 that improve the cutting qualities thereof. An angle 150 is formed between a line 152 formed where the second curved portion 135 abuts the first segment 140 and an axis 155 that is defined by elongating a sidewall 160 of a flat central base 165 (like the flat central base 70) of the blade 130. In the embodiment illustrated in FIG. 5, the angle 150 is about 77.5°, though in other embodiments (including those described below), that angle may vary. At about 77.5°, a leading edge 170 of a winged portion 175 of the blade 130 is raised relative to a trailing edge 180 of the winged portion 175.

In FIG. 6, a bottom blade 185 is provided that has an angle (unillustrated) at a second curved portion 190, the second curved portion 190 similar to the second curved portion 135 of the blade 130. However, the angle is about 90° rather than about 77.5°. The consequence of the greater angle may be that a leading edge 195 may be lower (rather than higher like the leading edge 170) than a trailing edge 200 of the blade 185.

FIG. 7 provides yet another alternative bottom blade 205. The blade 205 includes an angle (unillustrated) of about 75°, which like the blade 130, provides for a leading edge 210 that is higher than a trailing edge 215.

In operation, the angles at the second curved portions of the bottom blades described herein may vary. As the angle gets smaller, the leading edges may elevate relative to the trailing edges. This may increase efficiency of a blade, but that may come at the expense of bearings holding the blade (and other blades in place). Thus, while a variety of angles are foreseeable, most angles in the curved portions of the blades described herein may fall between about 70° and about 100°.

The above-described blade geometries preferably improve blending/mixing capabilities, while additionally providing enhanced food processing and ice crushing performance. The performance enhancements additionally serve to reduce wear-and-tear on the assembly's bearings and the appliance's motor. The blades 30, 35, 40 may include a hard coating in multiple colors to reduce friction and blade flex for further efficiency and improvements.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A blade assembly comprising:
    a top blade;
    a middle blade positioned below the top blade; and
    a bottom blade positioned below the middle blade, the bottom blade comprising:
    a flat base portion; and
    first and second wing portions extending downwardly and outwardly from the base portion, wherein the first and second wing portions each include:
        a leading edge and a trailing edge, wherein the leading edge includes an angled sharpened portion,
        a proximal segment, wherein the proximal segment is bent at a first angle within a first range of 50 degrees to 80 degrees relative to a horizontal longitudinal axis of the blade assembly, and
        a distal segment, wherein the distal segment is bent at a second angle within a second range of 15 degrees to 45 degrees relative to the horizontal longitudinal axis of the blade assembly.

2. The blade assembly of claim 1, wherein the angled sharpened portion has an upward angle of 30 degrees to 60 degrees.

3. The blade assembly of claim 2, wherein the angled sharpened portion has an upward angle of 45 degrees.

4. The blade assembly of claim 1, wherein the leading edge is straight and the trailing edge is curved.

5. The blade assembly of claim 4, wherein the trailing edge includes a first curvature on a proximal end thereof and a second curvature on a distal end thereof.

6. The blade assembly of claim 4, wherein a radius of curvature of the trailing edge is from 0.240 to 0.290 inches.

7. The blade assembly of claim 1, wherein the first angle is 64 degrees and the second angle is 30 degrees.

8. The blade assembly of claim 1, wherein the first and second wing portions have a proximal segment adjacent to the base portion, and wherein the first and second wing portions further include a connection segment connecting the proximal segment and the distal segment.

9. The blade assembly of claim 8, wherein an angle formed between a sidewall of the base portion adjacent the leading edge of the bottom blade and the connection portion is from 70 degrees to 100 degrees.

10. The blade assembly of claim 1, wherein the first wing portion opposes the second wing portion along a central vertical axis of the blade assembly.

11. A blending system comprising the blade assembly of claim 1 coupled to a rotatable shaft.

12. A blade stack for use in an appliance, the blade stack comprising:
    a rotatable shaft;
    a first blade in connection with the shaft;
    a second blade in connection with the shaft, the second blade positioned below the first blade;
    a third blade in connection with the shaft, the third blade positioned below the second blade, the third blade comprising:
    a flat base portion; and
    two wing portions, each wing portion extending downwardly from an end portion of the flat base portion and each wing portion including:
        a proximal segment, wherein the proximal segment is bent at a first angle within a first range of 50 degrees to 80 degrees relative to a horizontal longitudinal axis of the blade assembly, and
        a distal segment, wherein the distal segment is bent at a second angle within a second range of 15 degrees to 45 degrees relative to the horizontal longitudinal axis of the blade assembly, and
        a leading edge and a trailing edge, wherein the leading edge includes an angled sharpened portion at a third angle within a third range of 30 degrees to 60 degrees.

13. The blade stack of claim 12, wherein the first blade comprises a flat base portion, and the second blade comprises a flat base portion, and wherein the base portions of the first, second, and third blades are parallel such that a lower face of the base portion of the first blade abuts an upper face of the base portion of the second blade, and an upper face of the base portion of the third blade abuts a lower face of the base portion of the second blade.

14. The blade stack of claim 12, wherein the second blade is S-shaped.

15. The blade stack of claim 12, wherein the first blade comprises a flat base portion and first and second wing portions extending outwardly and upwardly from the base portion.

16. The blade stack of claim 12, wherein the angled sharpened portion has an angle of 45 degrees.

17. The blade stack of claim 12, wherein the leading edge is straight and the trailing edge is curved.

18. The blade stack of claim 17, wherein the trailing edge includes a first curvature on a proximal end thereof and a second curvature on a distal end thereof.

* * * * *